(12) United States Patent
Nurmela

(10) Patent No.: US 11,818,099 B2
(45) Date of Patent: *Nov. 14, 2023

(54) EFFICIENT MATCHING OF FEATURE-RICH SECURITY POLICY WITH DYNAMIC CONTENT USING USER GROUP MATCHING

(71) Applicant: Forcepoint LLC, Austin, TX (US)

(72) Inventor: Kari Nurmela, Helsinki (FI)

(73) Assignee: FORCEPOINT LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/479,336

(22) Filed: Sep. 20, 2021

(65) Prior Publication Data

US 2022/0006782 A1 Jan. 6, 2022

Related U.S. Application Data

(63) Continuation of application No. 16/183,125, filed on Nov. 7, 2018, now Pat. No. 11,128,602.

(51) Int. Cl.
*H04L 9/40* (2022.01)

(52) U.S. Cl.
CPC ...... *H04L 63/0245* (2013.01); *H04L 63/0263* (2013.01)

(58) Field of Classification Search
CPC .............. H04L 63/0245; H04L 63/0263
See application file for complete search history.

(56) References Cited

U.S. PATENT DOCUMENTS

| | | |
|---|---|---|
| 5,210,748 A | 5/1993 | Onishi et al. |
| 5,606,668 A | 2/1997 | Shwed |
| 5,835,726 A | 11/1998 | Shwed et al. |
| 5,916,305 A | 6/1999 | Sikdar et al. |
| 5,951,651 A | 9/1999 | Lakshman et al. |
| 6,341,130 B1 | 1/2002 | Lakshman et al. |

(Continued)

FOREIGN PATENT DOCUMENTS

EP  1006701  6/2000

OTHER PUBLICATIONS

Bailey, et al., "Pathfinder: A Pattern-Based Packet Classifier", Appears in "Proceedings of the First Symposium on Operating Systems Design and Implementation", Usenix Association, Nov. 1994, 9 pages.

*Primary Examiner* — Abiy Getachew

(74) *Attorney, Agent, or Firm* — Jackson Walker LLP; Christopher J. Rourk

(57) ABSTRACT

A method for filtering data packets at a firewall system is disclosed that includes receiving a data packet having a plurality of fields at a processor, and determining whether a precondition exists, where an action is associated the precondition. The action associated with the precondition is performed if it is determined that the precondition exists. The data packet is processed using a plurality of rules if it is determined that the precondition does not exist for the one or more of the plurality of fields. A user associated with the data packet is identified, and it is determined whether one or more rules are stored in a cache for one or more of a plurality of groups associated with the user. The data packet is processed using the one or more rules stored in the cache if present.

20 Claims, 2 Drawing Sheets

(56) References Cited

U.S. PATENT DOCUMENTS

| | | | |
|---|---|---|---|
| 6,606,710 B2* | 8/2003 | Krishnan | H04L 63/0227 726/13 |
| 6,628,653 B1 | 9/2003 | Salim | |
| 6,658,002 B1 | 12/2003 | Ross et al. | |
| 7,116,663 B2 | 10/2006 | Liao | |
| 7,386,525 B2* | 6/2008 | Nurmela | H04L 63/0263 726/13 |
| 7,881,215 B1 | 2/2011 | Daigle | H04L 67/142 370/252 |
| 8,627,448 B2* | 1/2014 | Santos | H04L 63/0263 726/13 |
| 10,878,110 B2* | 12/2020 | Kraft | G06F 21/51 |
| 2003/0051165 A1* | 3/2003 | Krishnan | H04L 63/0263 726/4 |
| 2010/0008359 A1* | 1/2010 | Kay | H04L 63/1416 370/389 |
| 2010/0138893 A1 | 6/2010 | Li | H04L 63/20 726/1 |
| 2010/0172257 A1 | 7/2010 | Yu | H04L 63/0245 370/252 |
| 2012/0110656 A1* | 5/2012 | Santos | H04L 63/0263 726/13 |
| 2019/0081983 A1* | 3/2019 | Teal | G06F 21/44 |

\* cited by examiner

US 11,818,099 B2

EFFICIENT MATCHING OF FEATURE-RICH SECURITY POLICY WITH DYNAMIC CONTENT USING USER GROUP MATCHING

RELATED APPLICATIONS

This non-provisional application is a continuation of U.S. patent application Ser. No. 16/183,125 filed Nov. 7, 2018, which is hereby incorporated by reference for all purposes as if set forth herein in its entirety.

TECHNICAL FIELD

The present disclosure relates generally to data packet filtering, and more specifically to efficient matching of a feature-rich security policy with dynamic content that uses user group matching for efficient matching.

BACKGROUND OF THE INVENTION

Data packet filtering is known in the art, but can require application of a large number of different rules to a large number of data packets. As a result, data packet filtering can be processor and time intensive, and acts as a bottleneck on data communications.

SUMMARY OF THE INVENTION

A method for filtering data packets at a firewall system is disclosed that includes receiving a data packet having a plurality of fields at a processor and determining with the processor whether a precondition is true for one or more of the plurality of fields, where an action is associated the precondition. The action associated with the precondition, including evaluating further remaining conditions, is performed on the data packet with the processor if it is determined that the precondition exists for one or more of the plurality of fields. The data packet is processed using a plurality of rules with the processor if it is determined that the precondition is true for the one or more of the plurality of fields. A user associated with the data packet is identified, and it is determined whether one or more rules are stored in a cache for one or more of a plurality of groups associated with the user. The data packet is processed using the one or more rules stored in the cache if they are present.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
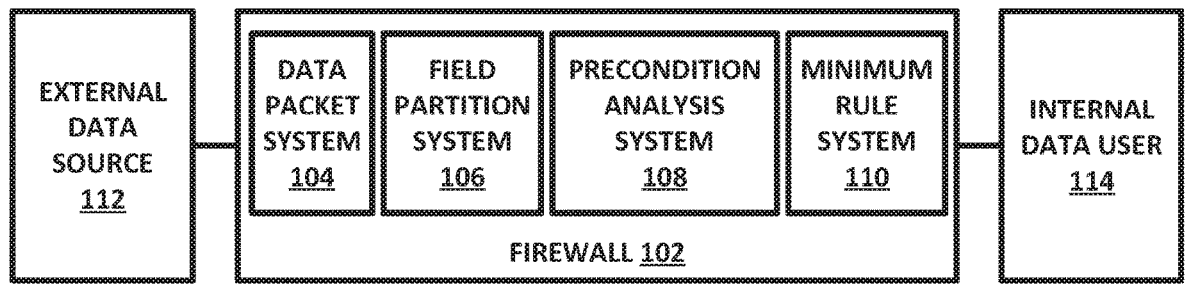
FIG. 1 is a diagram of a system for efficient matching of a feature-rich security policy with dynamic content, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

Packet screening rules can be used to provide a firewall to a private network, for use in screening data packets that are transmitted over a public network or other unprotected network to the private network. For example, a large number of rules can be used to identify data packets that are potential threats to devices on the network, and these rules can be used to prevent data packets from entering a device or system from a public network if the data packets do not satisfy the rules. A simple example of such rules are data packets that are received from a known compromised address, and a more complicated example of such rules are data packets that are from a country or region where there is a substantial amount of fraudulent activity and which use a software application that is known to be commonly exploited in that region to attack devices in the region containing the private network.

Policy matching is a data packet screening process that is implemented by going through the rules in order, checking the matching condition of each rule, and if the condition evaluates to true, doing the action defined in the rule. The matching conditions for each rule are used to perform checks on the values of the matching fields, like "source IP address," "destination TCP port," or "user name." The matching conditions are typically limited to be a Boolean combination of expressions of form "the value of matching field X is in set A." For example, "destination TCP port is 80 AND (source IP address is in range 10.0.0.0..10.255.255.255 OR user is 'alibaba')" is an example of a matching condition. Based on next generation firewall ("NGFW") design principles, this class of matching conditions (which may be referred to as "class I") may be sufficient to provide a feature rich language for defining practical firewall policies.

The present disclosure provides for efficient evaluation of the matching conditions, such as those disclosed in U.S. Pat. No. 7,386,525 B2, which is hereby incorporated by reference for all purposes as if set forth herein in its entirety. The security policy matching can be optimized by looking up the partitions of individual matching fields, such as the IPv4 source address. For each partition, the rules that cannot match when the matching field is in this partition are first computed, and that data is stored as a bit vector or as a list. When a new data connection is established, rules that cannot match by any of the matching fields present in the connection can be quickly eliminated, to speed up the firewall screening process for that connection, which can be referred to as a "fast matching algorithm." This process provides substantially more than the prior art ways of screening data packets because it reduces the amount of processor time that is needed to screen data packets by the use of intelligent partitions that are extracted from rules. A user can define rules having complex Boolean expressions, and the present disclosure provides systems and methods for preprocessing those rules to identify preconditions that can be used to quickly separate data packets that can be determined to meet one or more of the preconditions from data packets that must be processed by the corresponding rules.

Matching expressions of form "field X is in set A AND field Y is in set B AND field Z is in set C . . . " can be described as a Boolean AND of set inclusion expressions on individual fields. This process is a subset of class I (which may be referred to herein as "class II"). While the fast matching algorithm can find rules where the matching condition is true, class II is not sufficient to implement all the required features for a NGFW policy. The present disclosure relates to a hybrid approach, where for each rule, two conditions are formed. The first can be referred to as a "precondition" and is in class II, and the second can be referred to as a "remaining condition" and is in class I. If the original condition X is in class II, the precondition is X and the remaining condition is "true." If X is an AND, its arguments that are in class II when AND-ed can be split out, and those arguments can be put into the precondition, to leave the remaining arguments in the remaining condition. Otherwise, the precondition is "true" and the remaining condition is X.

The precondition of a rule is a logical condition that must be true for a rule to match, with a certain format ("field A in set 1 AND field B in set 2 . . . "). Table 1 in U.S. Pat. No. 7,386,525 lists four such conditions, for example on the third row the condition is that Field 1 is 4 or 5 AND Field 2 is any value from 1 to 10.

In the present disclosure, the actual condition of the rule in the user interface in the firewall can be more complex. For example, a condition "(Field 1 in 4..5) AND (Field 2 in 1..10) AND (Field 1==4 OR Field 2==10)" is too complex to be handled directly by the process disclosed in U.S. 7,386,525, because one of the top-level AND parts (Field 1==4 OR Field 2==10) refers to two separate fields.

The user interface condition "(Field 1 in 4..5) AND (Field 2 in 1..10) AND (Field 1==4 OR Field 2==10)" can be split into a precondition (Field 1 is 4 or 5 AND Field 2 is any value from 1 to 10) and a remaining condition (Field 1==4 OR Field 2==10). In this case the precondition can be seen as a subset of the original condition, but that is not always the case. The example algorithms in this disclosure can discover preconditions that are logically necessary for the original condition to match, but do not syntactically appear as a part of the original condition.

When using matching rules, the fast matching algorithm can be used on the preconditions to eliminate rules that cannot match. After eliminating those rules, a trivial (but slow) algorithm can be used to go through the remaining conditions in the rules to identify the ones that match. This approach has the problem that there are too often complex remaining conditions and "true" as the precondition, so that the policy matching reduces to the trivial algorithm that goes through the whole set of matching conditions before a decision can be made to accept or deny a packet. Another problem is that the fast matching algorithm is not designed for small incremental changes in the firewall policy. The present disclosure can be used to eliminate or reduce those shortcomings, as discussed below, and provides substantially more than prior art processes by reducing the amount of time and processor resources needed to screen data packets.

In a first example embodiment, the matching conditions are systematically analyzed to extract the necessary preconditions out of them, and then the remaining matching conditions are simplified by taking the (current) precondition into account. Depending on the depth of the analysis, repeating these steps may make the precondition more strict, allowing further simplifications in the remaining condition, and the steps can be repeated as long as there is progress. This process greatly reduces the number of conditions in the "remaining condition," making the application of the fast matching algorithm and trivial matching of the remaining condition more efficient.

FIG. 1 is a diagram of a system 100 for efficient matching of a feature-rich security policy with dynamic content, in accordance with an example embodiment of the present disclosure. System 100 includes firewall 102, which further includes data packet system 104, field partition system 106, precondition analysis system 108 and minimum rule system 110, and is used to allow or prevent data from being transmitted to internal data user 114 from an external data source 112, based on rules that are created by system administrators using firewall 102.

Internal data user 114 uses a processor or other data processing device to access data from external data source 112, which can be a data server, a web server or other suitable data sources. External data source 112 is one of a plurality of potential data sources, some of which may contain malware or have data or services that internal data user 114 is protected from accessing, based on enterprise policies. In order to limit access by internal data user 114 to approved external data sources 112, firewall 102 processes data packets generated by external data sources 112 to determine whether they comply with a plurality of rules that are used to prevent unauthorized access to external data sources by internal data user 114. U.S. Pat. No. 7,386,525 discloses data packet filtering systems and methods that can be used to provide some level of protection. However, more complex rules cannot be directly applied, and additional innovations disclosed herein can be used with the data packet filtering of U.S. Pat. No. 7,386,525 to further expedite data packet review.

Data packet system 104 receives data from an external data source that is being transmitted to an internal data user in the form of packets, identifies predetermined fields within each data packet and processes the fields according to filter rules to determine whether the data packet should be provided to the internal data user. In one example embodiment, data packet system 104 can use rule preconditions to identify data packets that can be used to quickly allow or block data packets, can apply shortcuts for trivial matching, can apply small incremental precondition changes and user group matching to reduce filter processing time and can perform other suitable functions, as discussed further herein.

Field partition system 106 extracts field data values that are used to analyze whether a data packet meets preconditions, filter rules or other suitable parameters that are used to allow or prevent the data packet from being transmitted from an external data source to an internal data user. In one example embodiment, a data packet can include a large number of fields, where a subset of those fields needs to be analyzed to determine whether the data packet should be allowed or prevented. Field partition system 106 can extract the field data values of interest for subsequent processing, as a function of one or more preconditions, rules or other parameters.

Precondition analysis system 108 is configured to convert digital data representing a feature-rich matching condition with arbitrary Boolean expressions into digital data representing a precondition that can be efficiently matched, such as by using the process disclosed in U.S. Pat. No. 7,386,525 or other suitable processes. In one example embodiment, precondition analysis system 108 can extract partitions of a rule that necessarily cause the rule to either always match or never match a data packet, such as one or more fields that cause the data packet to match a rule or to never match a rule. The partitions can then be used to create algorithms or digital data structures that can be applied to data packets to quickly determine whether the packet should be blocked or allowed.

Minimum rule system 110 is configured to process digital data that defines a plurality of data processing rules into a minimum rule set for use in filtering incoming data packets. In one example embodiment, minimum rule system 110 can process the digital data that defines a plurality of data processing rules to create a set of minimum rules that can be used to filter data packets, such as for a specific user, for a group of users, for an IP address, for an organization or for other suitable entities. Minimum rules system 110 can analyze shortcuts for trivial matching, can analyze the impact of small incremental precondition changes, can implement efficient user group matching and can perform other suitable functions.

In operation, system 100 performs efficient matching of a feature-rich security policy with dynamic content to prevent or allow content from being transmitted to an internal user by a firewall system, based on predetermined rules. System 100 optimizes firewall processing of data packets to improve the speed and efficiency of the system.

Figure 2:
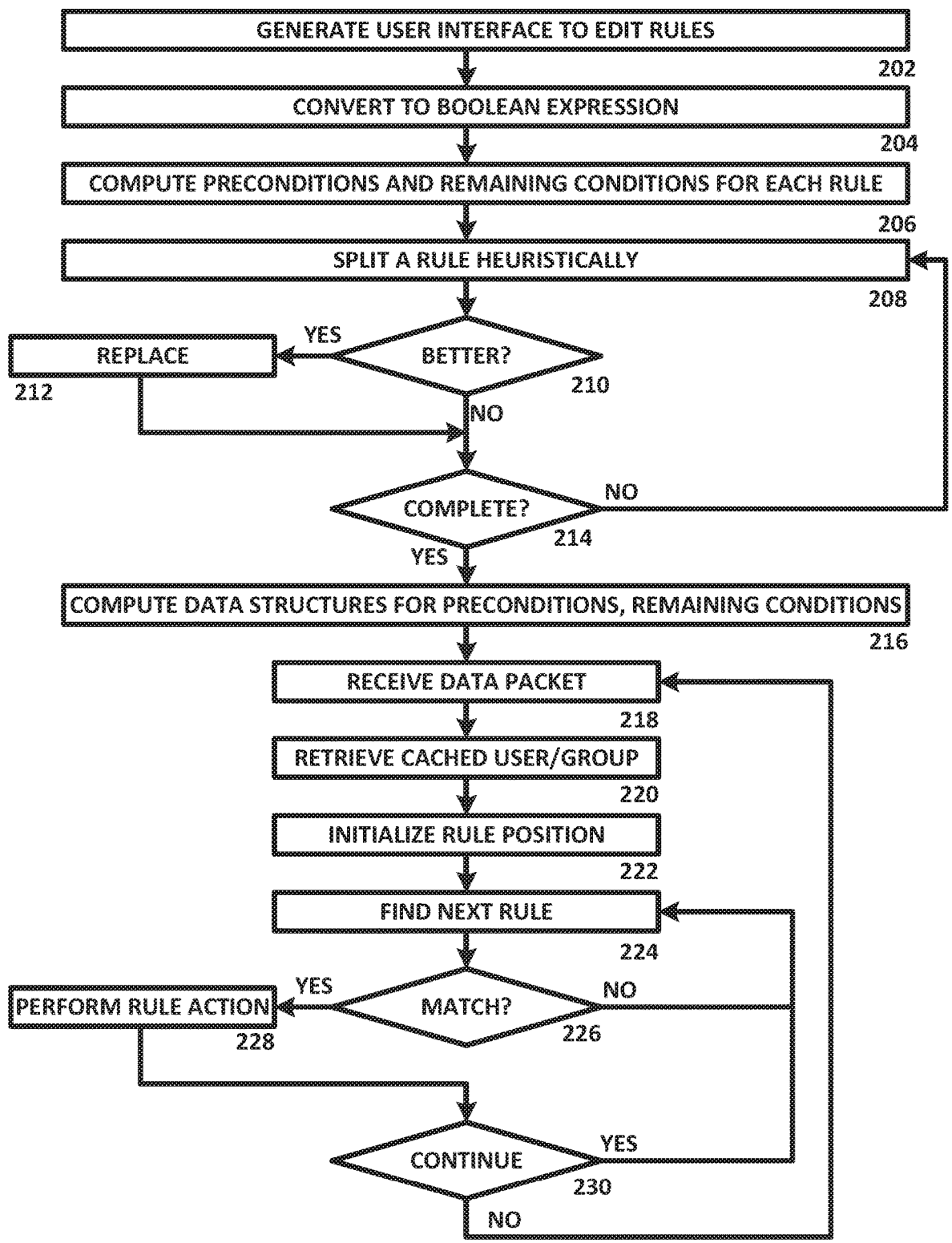
FIG. 2 is a diagram of an algorithm for identifying and applying data filtering rule preconditions to data packets, in accordance with an example embodiment of the present disclosure.

FIG. 2 is a diagram of an algorithm 200 for identifying and applying data filtering rule preconditions to data packets, in accordance with an example embodiment of the present disclosure. Algorithm 200 can be implemented on one or more processors, such as at a firewall system for controlling external data access to a network data processing network.

Algorithm 200 begins at 202, where a user interface is generated to allow a user to define a plurality of data packet filtering rules. In one example embodiment, the user interface can generate user prompts for entering data field restrictions, for selecting Boolean operators and for performing other suitable functions. The algorithm then proceeds to 204.

At 204, the data packet filtering rules are converted to Boolean expressions. In one example embodiment, the field entries from the user interface can be converted into Boolean expressions in accordance with the user interface configuration, or other suitable processes can also or alternatively be used. The algorithm then proceeds to 206.

At 206 the algorithm identifies preconditions and remaining conditions for each rule. In one example embodiment the preconditions and remaining conditions can be identified by evaluating a rule to identify Boolean operators, and then by separating portions of the rule in accordance with the Boolean operators, as discussed further herein. In one example embodiment, the algorithm can identify conditions in a rule that are separated by a Boolean OR operator and can separate those conditions into potential preconditions and remaining conditions. The conditions that are potential preconditions and remaining conditions can be further evaluated, such as to determine whether the condition identifies one or more fields that renders the rule always false (and is thus a precondition), or if the condition includes one or more fields that are dependent on the value of another field to cause the field to be either true or false. The algorithm then proceeds to 208.

At 208, the algorithm optionally selects a rule and tries to split it into two rules. In one example embodiment, the algorithm can make two or more copies of the rule, and then adding mutually exclusive additional conditions to each copy of the rule. Preconditions and remaining conditions can then be determined for the resulting modified rules. The algorithm then proceeds to 210.

At 210, the resulting modified rules are compared to the original rule. In one example embodiment, the algorithm can compare the remaining conditions of the modified rules and select the modified rules with the shorter remaining conditions. In another example embodiment, the algorithm can use test data to determine whether the resulting rules are more efficient than the original rule by virtue of requiring less steps, less processing time, less memory or other fewer resources. If it is determined that the resulting rules are more efficient in regards to one or more criteria, the algorithm proceeds to 212, otherwise the algorithm proceeds to 214.

At 212, the modified rules resulting from splitting one original rule are used in place of the original rule. The algorithm then proceeds to 214.

At 214, the algorithm determines if further rule splits on the modified rules should be evaluated. Because the modified rules can each have a precondition and a remaining condition of their own, they can potentially be further split into additional modified rules at 208. In one example embodiment, the algorithm can process the modified rules using one or more predetermined split methods, such as to determine whether IPv4 and IPv6 addresses can be processed as separate rules, to determine whether UDP and other IP protocols can be processed in separate rules, or in other suitable manners. If it is determined that additional rule modifications can be applied, the algorithm returns to 208, otherwise the algorithm proceeds to 216.

At 216, the algorithm generates data structures for the preconditions of the rules. In one example embodiment, the data structures can be generated using the process described in U.S. Pat. No. 7,386,525, or other suitable processes can also or alternatively be used. The algorithm can also generate data structures for the remaining conditions, such as by using flow charts to direct comparisons of match field values when evaluating the remaining condition for a received packet, and by optionally adding shortcuts in the flowchart to optimize the matching if matching conditions are identified. The algorithm then proceeds to 218.

At 218, the algorithm receives a data packet that includes a plurality of fields, where each field has a data value that can be compared to one or more matching fields. The algorithm then proceeds to 220.

At 220, user data and group data from the packet is retrieved. The cache for user and group matching rules is checked to determine whether it indicates that some rules cannot match. If the cache does not yet contain rule information for this user and group, the algorithm may evaluate rules that never match for the associated user data and/or group data, and can add that rule information to the cache. The algorithm proceeds to 222.

At 222, the algorithm sets the current rule position to the beginning of the rules. The algorithm proceeds to 224.

At 224, the algorithm determines the next rule that may match, based on rule preconditions and on the user and group information. This determination can be performed using the processes in U.S. Pat. No. 7,386,525 or by other suitable processes. The algorithm then proceeds to 226.

At 226, the remaining condition is evaluated for the match field values retrieved from the received packet. If the remaining condition are determined to result in an evaluation of false, the algorithm returns to 224 to find more rules that may match. If the remaining condition evaluates to true, the rule matches, and the algorithm proceeds to 228.

At 228, the action described in the rule is performed. In one example embodiment, an action can include "allow packet," "discard packet," it can set options that affect the handling of the packet, it can require that further rules are checked, or other suitable processes can also or alternatively be implemented. The algorithm proceeds to 230.

At 230, the algorithm determines whether any further matching rules should be checked. If the action in the current rule indicates that the security policy matching for the packet is complete, the algorithm returns to 218 to receive the next data packet. If the action indicates that further rules should be checked, the algorithm returns to 224.

The data structures computed at 216 can be updated incrementally if additional information is received. In one example embodiment, additional information can be received when the DNS name starts to map to a different IP address.

The data structures may be only partially computed at 216, and the missing parts may be computed into their complete form only when they are needed at 224 or at 226.

Although algorithm 200 is shown as a flow chart, it can be implemented using object oriented programming, as a state machine or in other suitable manners.

As shown, the policy is configured in accordance with the following steps:
1. Access a data memory that stores the rule, such as by identifying one or more parameter fields and an action associated with the rule.
2. Partition the parameter field value spaces using a processor that is programmed according to a matching condition in the rule, such as by using the fast matching algorithm or other suitable processes.
3. Determine which partitions alone make the matching condition necessarily evaluate to false, such as by evaluating a plurality of input data conditions in sequence using the processor and creating a table that contains the identified partitions.
4. Generate the complement of these partitions using the processor. This is the precondition of the rule.
5. Analyze the matching condition bottom-up, replacing each subexpression by "true" or "false" if the precondition makes the subexpression always true or false, such as to produce the remaining condition for the rule or for other suitable purposes.

Neither 3 nor 5 are complete (in regards to a complete logical process), so they may fail to identify cases where a precondition can be extracted, or when a subexpression necessarily evaluates to true or false. Instead, they are compromises to keep the implementation simple and efficient. As a result, repeating the process can improve the accuracy of the process.

In one example embodiment, this process is demonstrated by the following example:
matching condition: PortDst IN {8}
precondition: PortDst IN {8}
remaining condition: true In this example, the matching condition is a feature-rich generic Boolean expression. These expressions are built with the Boolean operators AND, OR, and NOT, whose arguments are similar Boolean expressions, or IN expressions that specifies that the value of a matching field such as PortDst is in the given set of values or value ranges. The special values "true" and "false" depict an expression that is always true or false, respectively. From the matching condition a precondition and a remaining condition are computed, for example by the methods described above, such that the precondition AND the remaining condition is logically equivalent to the original matching condition, and such that the precondition is a single IN expression or an AND expression of such IN expressions, suitable to be used with the process disclosed in U.S. Pat. No. 7,386,525 or other suitable processes. In this simple example the precondition is identical to the original matching condition, and the remaining condition is "true," which is the desired outcome because then there is no additional matching needed after matching the precondition using another process, such as that disclosed in U.S. Pat. No. 7,386,525.

Another example includes the following:
matching condition: PortDst IN {6 . . . 8}
precondition: PortDst IN {6 . . . 8}
remaining condition: true The above example is the same as the previous example, except that instead of 8, the "port destination" matching field value is in the range 6 . . . 8, i.e. 6, 7, or 8. The precondition in this example is also a range.

The following example combines IN expressions within an OR:
matching condition: PortDst IN {6} OR PortDst IN {8}
precondition: PortDst IN {6, 8}
remaining condition: true The following example combines IN expressions within an AND:
matching condition: PortDst IN {6} AND PortDst IN {8}
precondition: PortDst IN { }
remaining condition: false In the above example, the remaining condition becomes "false," which means that the rule cannot match and can be ignored (the port destination cannot be 6 and 8 at the same time). This can be seen also from the precondition that requires that the PortDst is in an empty set, which is not feasible. Another example for combining IN expressions within an AND:
matching condition: PortDst IN {2 . . . 4} AND PortDst IN {3 . . . 5}
precondition: PortDst IN {3 . . . 4}
remaining condition: true NOT can be used with IN to exclude values:
matching condition: (NOT PortDst IN {2 . . . 4}) AND (NOT PortDst IN {3 . . . 5})
precondition: PortDst IN {0 . . . 1, 6 . . . 63355}
remaining condition: true In the above example the minimum value of PortDst is 0 and the maximum value is 65535, so excluding the ranges 2 . . . 4 and 3 . . . 5 leaves the ranges shown in the precondition. The parentheses "(" and ")" are used to indicate the precedence of AND/OR/NOT operators when unclear.

In the following example the remaining condition is identical to the original matching expression, but a precondition can still be made:
matching condition: (PortSrc IN {1} AND PortDst IN {2}) OR (PortDst IN {3})
precondition: PortDst IN {2, 3}
remaining condition: (PortSrc IN {1} AND PortDst IN {2}) OR (PortDst IN {3})

In the following example the common IpProto condition can be taken out of the AND expression, allowing combining the remaining IN expressions:
    matching condition: (IpProto IN {6} AND PortDst IN {4}) OR (IpProto IN {6} AND PortDst IN {8})
    precondition: PortDst IN {4, 8} AND IpProto IN {6}
    remaining condition: true In the following example the common IpProto IN {6} condition can be taken out of the AND expression, allowing combining the remaining IN expressions.
    matching condition: (IpProto IN {6} AND PortDst IN {4}) OR (IpProto IN {6} AND PortDst IN {8}) OR (IpProto IN {1})
    precondition: IpProto IN {1, 6}
    remaining condition: (IpProto IN {6} AND PortDst IN {4, 8}) OR (IpProto IN {1})

In the following example there is a IN expression with empty set { }, which is the same as "false":
    matching condition: (IpProto IN {6} AND PortDst IN {4}) OR (IpProto IN {6} AND PortDst IN {8}) OR (IpProto IN {1} AND PortDst IN { })
    precondition: PortDst IN {4, 8} AND IpProto IN {6}
    remaining condition: true In the following example there are nested AND expressions:
    matching condition: (MacType IN {1} AND IpSrc IN {2}) AND (IpProto IN {3} AND PortDst IN {4})
    precondition: PortDst IN {4} AND IpProto IN {3} AND MacType IN {1} AND IpSrc IN {2}
    remaining condition: true The following example still produces a "true" remaining condittition:
    matching condition: ((MacType IN {1} AND IpSrc IN {2}) OR (MacType IN {1} AND IpSrc IN {5})) AND (IpProto IN {3} AND PortDst IN {4})
    precondition: PortDst IN {4} AND IpProto IN {3} AND MacType IN {1} AND IpSrc IN {2, 5}
    remaining condition: true The following example excludes some IpSrc values out of the range 1 . . . 8:
    matching condition: IpSrc IN {1 . . . 8} AND (NOT IpSrc IN {2}) AND (NOT IpSrc IN {4, 5})
    precondition: IpSrc IN {1, 3, 6 . . . 8}
    remaining condition: true In the following example the remaining condition stays the same as the original matching condition, but a nonempty precondition can still be made:
    matching condition: (IpSrc IN {1} AND NOT PortDst IN {2}) OR (IpSrc IN {3})
    precondition: IpSrc IN {1, 3}
    remaining condition: (IpSrc IN {1} AND NOT PortDst IN {2}) OR (IpSrc IN {3})

The content of the matching condition can be obtained from a graphical user interface (such as where a user has created a rule with a matching condition on "mac type," "IP src," "IP proto" and "port dst" matching fields) or other suitable sources. The disclosed simplification algorithm discussed above modifies the matching condition expression into two parts: a precondition and a remaining condition. The algorithm works so that the AND of the precondition and the remaining condition is equivalent to the original condition from the user interface, and allows the precondition to be handled efficiently by a process such as the one disclosed in U.S. Pat. No. 7,386,525 or other suitable processes.

These examples demonstrate the kinds of modifications that are possible to do in an automated way. The simplification algorithm works in an automated way, and can be implemented in a number of different suitable manners. In one example embodiment, the work can be performed on a syntactical level, but the work can utilize search techniques to go through the matching field value spaces or other suitable processes. The algorithm is a compromise between efficiency, expressiveness, and complexity, to go from a feature rich user-interface condition into a condition that largely or completely can be handled by a process such as the one disclosed in U.S. Pat. No. 7,386,525 or other suitable processes.

In the following example the acceptable values of IpSrc depend on the values of MacType:
    matching condition: ((MacType IN {1} AND IpSrc IN {2}) OR (MacType IN {8} AND IpSrc In {5})) AND (IpProto IN {3} AND PortDst IN {4})
    precondition: PortDst IN {4} AND IpProto IN {3} AND MacType IN {1, 8} AND IpSrc IN {2, 5}
    remaining condition: (MacType IN {1} AND IpSrc IN {2}) OR (MacType IN {8} AND IpSrc IN {5})

This kind of dependency between two matching fields cannot be expressed in the precondition that needs to be an AND of IN expressions, to allow a process such as that disclosed in U.S. Pat. No. 7,386,525 or other suitable processes to be used for matching the precondition, so the remaining condition is not "true", and it can be checked separately if the precondition matches. The firewall extracts the precondition and separates the precondition from the remaining condition automatically.

An analogous expression can be formed, if the user gives an IPv4 source address, an IPv6 source address, and a TCP destination port, meaning that the source port is either the given IPv4 address or the given IPv6 address, and the destination TCP port is 4, assuming that the IP source addresses are handled by the same matching field, and the IP version is given in a separate matching field.

In a second example embodiment, the efficiency of rule matching can be improved by splitting the rule into two or more rules, in some cases. Consider the following example:
    matching condition: (IpProto IN {6} AND PortDst IN {80}) OR (IpProto IN {17} AND PortDst IN {53})
    precondition: IpProto IN {6, 17} AND PortDst IN {53, 80}
    remaining condition: (IpProto IN {6} AND PortDst IN {80}) OR (IpProto IN {17} AND PortDst IN {53})

The above example is analogous to a matching condition where the rule is for TCP port 80 commonly used for HTTP and UDP port 53 commonly used for DNS. The precondition eliminates some cases where the rule cannot match, but doesn't eliminate for example the case where the IpProto is 17 and PortDst is 80, where the rule does not match. Another problem is that the precondition does not simplify the remaining condition. The matching condition handling can be improved by splitting the rule with this matching condition into two rules with the following matching conditions, respectively:
    1. (IpProto IN {6}) AND M, and
    2. (IpProto IN {17}) AND M
where M is the original matching condition. This algorithm provides an improved precondition and simplifies the remaining conditions to "true":
    1. precondition: IpProto IN {6} AND PortDst IN {80}, remaining condition: true
    2. precondition: IpProto IN {17} AND PortDst IN {53}, remaining condition: true After splitting the rule, matching can be performed using the fast matching algorithm or other suitable processes. The decision whether to split can be made by a processor that first extracts the preconditions from the original rule, as previously discussed. If there are multiple IP protocols or IP versions in the precondition, the rule can be split by TCP/UDP/other, or by IPv4/IPv6, and the sizes of the remaining conditions can be compared to determine whether splitting results in an improvement.

Consider the following example that is analogous to a matching condition that allows either of two source IP addresses, one IPv4 and one IPv6, and furthermore requires certain IpProto and PortDst values:

matching condition: ((MacType IN {1} AND IpSrc IN {2}) OR (MacType IN {8} AND IpSrc In {5})) AND (IpProto IN {3} AND PortDst IN {4})
    precondition: PortDst IN {4} AND IpProto IN {3} AND MacType IN {1, 8} AND IpSrc IN {2, 5}
    remaining condition: (MacType IN {1} AND IpSrc IN {2}) OR (MacType IN {8} AND IpSrc IN {5})

In this example the matching condition is too complex to optimize well (the remaining condition is not "true"). But if the rule is split by adding condition MacType IN {1} to the original rule (and would then create another rule with MacType IN {8}, not shown), then this more specialized rule resulting from the splitting again optimizes well:

matching condition: ((MacType IN {1} AND IpSrc IN {2}) OR (MacType IN {8} AND IpSrc In {5})) AND (IpProto IN {3} AND PortDst IN {4}) AND MacType IN {1}
    precondition: PortDst IN {4} AND IpProto IN {3} AND MacType IN {1} AND IpSrc IN {2}
    remaining condition: true The splitting of the rule into several rules can be done in some cases to make more strict preconditions, and more efficient policy matching. In some cases, rule splitting alone can make the conditions suitable for use with the process disclosed in U.S. Pat. No. 7,386,525, but more complex conditions can be processed to identify preconditions when rule splitting alone isn't sufficient.

In regards to the present disclosure, a "rule" has a single condition that can be a Boolean AND/OR/NOT expression of other conditions, with the "leaf" conditions being comparisons of "matching fields" against sets of matching field values. A rule thus does not refer to a set of conditions, but a single condition of the rule can be a Boolean expression of multiple subconditions, which can be equivalent to having multiple conditions, where the multiple conditions can be concatenated with AND into a single Boolean condition.

In addition, a "rule" in a firewall consists of a condition and an action with options, like "Permit" or "Block (with logging)." The conditions in the rules are checked one rule at a time, in order, until a rule is found where the condition is true, in which case the rule "matches", and the action in that rule is performed. Multiple rules thus cannot generally be combined into a single rule, because the original rules can have conflicting actions.

If a rule has a condition where the top level expression is an OR, then it can be split into multiple rules by just taking each of the subexpressions and the original action. For example, for a rule such as:

condition: IP_source=10.0.0.1 OR IP_source=10.0.0.2
    action=block the rule can be split into two rules:

Rule 1:
    condition: IP_source=10.0.0.1
    action=Block

Rule2:
    condition: IP_source=10.0.0.2
    action=Block

The case where the top level expression is an OR is rare in practice, it usually is an AND, and the OR parts are buried a bit deeper.

The present disclosure can be implemented using an heuristic splitting algorithm in the firewall. If mutually exclusive conditions are added to a condition, it can then be tested whether the resulting conditions seem better than the original condition. In one example embodiment, consider the following rule:

matching condition: (IpProto IN {6} AND PortDst IN {80}) OR (IpProto IN {17} AND PortDst IN {53})
    precondition: IpProto IN {6, 17} AND PortDst IN {53, 80}
    remaining condition: (IpProto IN {6} AND PortDst IN {80}) OR (IpProto IN {17} AND PortDst IN {53})
    action=Permit (*)

This kind of rule can be used to allow HTTP (IpProto 6, PortDst 80) and DNS queries (IpProto 17, PortDst 53).

For a case that includes two matching fields: "IP protocol" and "destination port," the IP protocol is valid for all IP packets, and the destination port is valid if the IP protocol is TCP or UDP. This condition is too complex for the process disclosed in U.S. Pat. No. 7,386,525, but this rule can be split by dividing the IP protocol value range into three separate conditions (TCP=6, UDP=17 and other) and handling each of these separately:

Rule 1:
    matching condition: IpProto IN {6} AND ((IpProto IN {6} AND PortDst IN {80}) OR (IpProto IN {6} AND PortDst IN {53}))
    action: Permit Rule 2:
    matching condition: IpProto IN {17} AND ((IpProto IN {6} AND PortDst IN {80}) OR (IpProto IN {6} AND PortDst IN {53}))
    action: Permit Rule 3:
    matching condition: (NOT IpProto IN {6, 17}) AND ((IpProto IN {6} AND PortDst IN {80}) OR (IpProto IN {6} AND PortDst IN {53})) action: Permit Running algorithm 200 yields:

Rule 1:
    precondition: IpProto IN {6} AND PortDst IN {80}
    remaining: true
    action: Permit Rule 2:
    precondition: IpProto IN {17} AND PortDst IN {53}
    remaining: true
    action: Permit Rule 3:
    precondition: false
    action: Permit Rule 1 and Rule 2 have simple enough conditions after processing with algorithm 200 for subsequent processing using the process of U.S. Pat. No. 7,386,525 (meaning that the remaining conditions are empty, i.e. true), and since the Rule 3 precondition is "false", it can be left out. So the result is clearly better than the original, and the rule can be split. Alternatively, if the result is not better, the original rule can be used. Determination of whether the rule modification is better can be made by processing a plurality of test data sets with the different rules to determine which is better, or in other suitable manners.

In a third example, for a matching condition that is a list of TCP and UDP services that are conditions of form "IP protocol is TCP or UDP AND destination port is X," if HTTP, DNS, and FTP services are in the condition, it becomes "(IP protocol is TCP AND destination port is 80) OR (IP protocol is UDP AND destination port is 53) OR (IP protocol is TCP AND destination port is 21)." This condition can be represented like the following flowchart algorithm.

Figure 3:
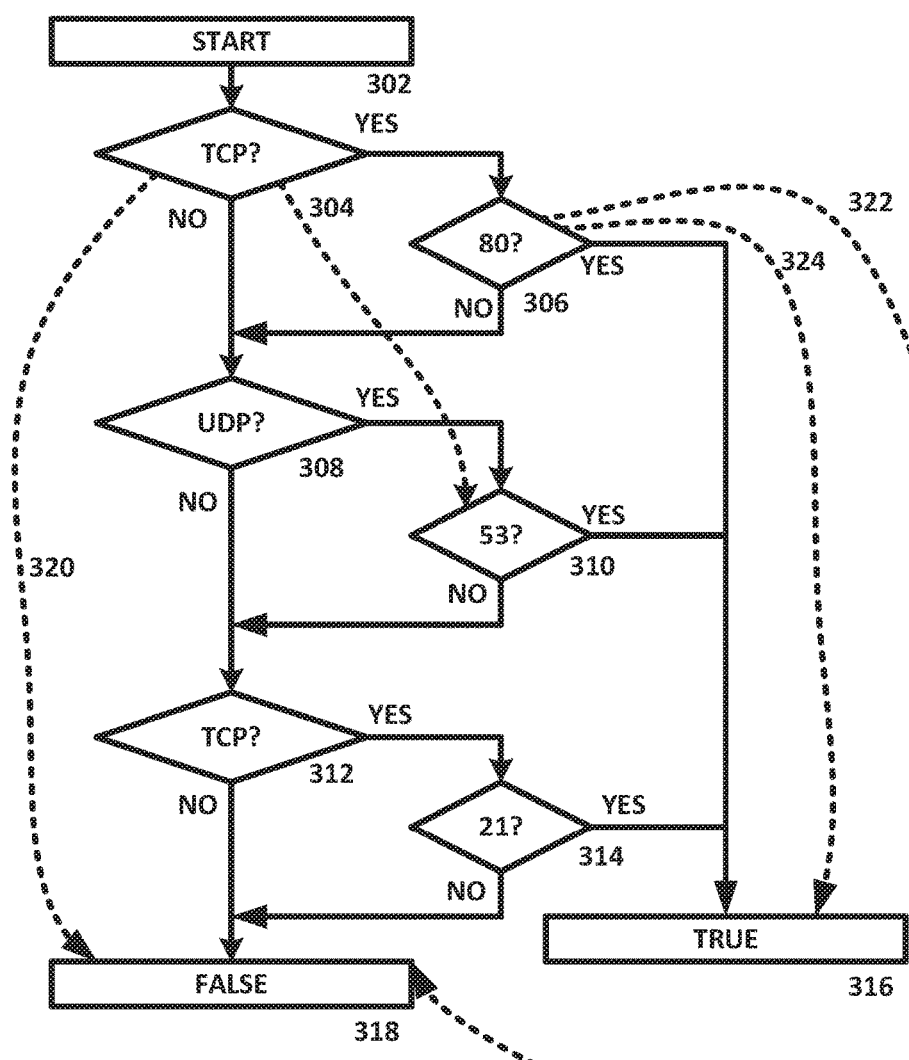
FIG. 3 is a diagram of an algorithm for matching with comparison nodes to optimize the matching of the remaining condition, in accordance with an example embodiment of the present disclosure.

FIG. 3 is a diagram of an algorithm 300 for matching with comparison nodes to optimize the matching of the remaining condition, in accordance with an example embodiment of the present disclosure. Algorithm 300 can be implemented on one or more processors, such as at a firewall system for controlling external data access to a network data processing network.

Algorithm 300 begins at 302 where a data packet is received, and proceeds to 304. At 304 it is determined whether the data packet includes TCP. If it is determined that the data packet does not contain TCP, the algorithm proceeds to 308, otherwise it proceeds to 306. Likewise, if it is determined that the data packet is not TCP or UDP, the algorithm can proceed by 320 to 318. In addition, if it is determined that the data packet is TCP with an address of 53, the algorithm can proceed to 310.

At 306, it is determined whether the TCP address is 80. If it is determined that the TCP address is 80, the algorithm proceeds to 316 where the filter condition is set to true, otherwise the algorithm proceeds to 308. Alternatively, the algorithm can proceed by 322 to 318 if it is determined that the TCP address is not 80 or 21, and can proceed to 316 by 324 if is it determined that the TCP address is 21.

At 308, it is determined whether the data packet includes a UDP address. If it is determined that the data packet does not include a UDP address, the algorithm proceeds to 312, otherwise it proceeds to 310, where it is determined whether the UDP address is 53. If it is determined that the UDP address is 53, the algorithm proceeds to 316, otherwise the algorithm proceeds to 312.

At 312, it is determined whether the data packet has a TCP address. If it is determined that the data packet does not contain TCP, the algorithm proceeds to 318, otherwise it proceeds to 314.

At 314, it is determined whether the TCP address is 21. If it is determined that the TCP address is 21, the algorithm proceeds to 316, otherwise the algorithm proceeds to 318.

Although algorithm 300 is shown as a flow chart, it can be implemented using object oriented programming, as a state machine or in other suitable manners.

Dotted lines 320, 322 and 324 are shortcuts that can be computed after the flowchart is initially constructed. The "not TCP or UDP" shortcut 320 can be taken when the IP protocol is something else than UDP or TCP, because the condition always ends up in the "false" state. Similarly, the "UDP" shortcut can be taken if the IP protocol is UDP, which can go to the "53" comparison. The shortcut "not 80 or 21" shortcut 322 is slightly more involved: just considering the port number, it is not known whether "53" will end up to "false" or not. But since paths to the beginning of shortcut "not 80 or 21" necessarily go through the condition "protocol==TCP", that option can be taken as granted, and all port numbers other than 80 and 21 will end up as "false". The shortcut 324 "not 80, but 21" similarly takes "protocol==TCP" for granted, and the port 21 will end up in 316, so the shortcut can be added.

In general, from any current node, the next node can be selected based on the comparison result. Shortcuts for partitions of matching field values can be attached to the comparison nodes. For each shortcut, the paths leading to the comparison node in the flowchart can be checked, and the conditions on the matching field values that are implied from the comparison nodes on those paths can be collected. Then, the farthest common point in the flowchart can be computed for all the paths starting from the comparison node, taking into account the selected partition and the implied conditions, for each partition of the matching field values that is compared in each comparison node.

During the matching of the remaining condition, the partition of the matching field value is performed when a comparison node is reached, and the process jumps directly to the node pointed by the shortcut corresponding to the matching node and matching field partition. It is also or alternatively possible to compute these shortcuts lazily, while the policy is being used on operational traffic. The selection of where to compute the shortcuts can be based on the number of times the comparison node is visited, so that the shortcut compilation and the additional memory used is spent on those nodes that are most heavily used, or in other suitable manners. It is also possible to use traffic statistics that have been previously collected when deciding where to add the shortcuts.

This shortcut method can be used independent of determination of preconditions. In one example, shortcuts can be determined by finding all paths to the current position (P1) in a flowchart, seeing how these paths limit the matching field values (condition A), and can then continue forward for each partition of the matching field values used the current position (each partition giving a different condition B), to see if there is a common position (P2) in the flowchart ("sink state") which is the end state when assuming A and B. If the process is in P1 and B is true, it can go directly to position P2.

In a fourth example embodiment, adding or removing one or a small number of matching field values from the precondition may have an impact on the outcome of the rules. The following are examples of situations where this is the case:
 1. user information: the IP address/user mapping changes slightly when a user moves to a different network location.
 2. DNS: if an IP address corresponding to a domain name changes but the content and functionality of the domain name remains the same
 3. IP lists: a few addresses are added to or removed from an IP list (like a list of known malware distribution points)

These kinds of incremental changes can be incorporated into the above algorithms by re-computing the rule precondition and the remaining condition of the affected rules, and then updating the partitioning used in the fast matching algorithm. This processing can be done relatively easily, because adding or removing a single value splits a partition into two or three partitions, or combines two or three partitions into one.

In a multi-threaded environment, processing can be performed without excessive locking by using two or more data structures, where a first data structure is in active use and the other data structures can be updated. Multiple updates can be made to the other data structures before any of them are made active, such as with batching or in other suitable manners.

If the IP source range or "partition" is known, such as 10.1.0.0 . . . 10.1.255.255, that data can indicate that rules 1, 2, and 6 may match. Then additional information is received that the source IP address 10.1.32.32 corresponds to a user.

Then, rules 1, 2, and 6 are checked to see if they still may match for 10.1.32.32, knowing the user. If it is found that the user is filtered out in rule 2, the original partition can be split into three:

10.1.0.0 . . . 10.1.32.31 may match to rules 1, 2, and 6
10.1.32.32 . . . 10.1.32.32 may match to rules 1 and 6
10.1.32.33 . . . 10.1.255.255 may match to rules 1, 2, and 6

Similarly if 10.1.32.32 now corresponds to the user, the three partitions can be combined back to the original single partition that may match to rules 1, 2, and 6.

The use of preconditions is not necessary using this incremental change process but can be used, and it can be performed in conjunction with the process disclosed in U.S. Pat. No. 7,386,525. The preconditions can be updated when new information is obtained, such as a new IP address for the user when the user is authenticated in the firewall.

The incremental update procedure can be used in the user example case to find out which rules can match with that source IP address, knowing that it is a specific user. First, the process goes through all the rules, and then in those rules where the precondition conflicts with the new information, the precondition is adjusted, possibly splitting the partition of IP addresses where 10.0.0.3 resides. Similarly, when 10.0.0.3 ceases to be associated with the user, authentication expires).

In a fifth example embodiment, efficient user group matching can be performed. For example, for an access point that is associated with a specific user, user group matching can use filtering parameters associated with different groups where it would otherwise not be possible to handle the set of groups as a single matching field, due to combinatorial explosion. In this embodiment, caching of policies for different user groups can be used to improve efficiency. First, all groups that are associated with the user that are not mentioned in the policy can be ignored, and a cache entry can be checked for the remaining set of groups. If there is a cache entry, it can be used to identify which rules may match for these groups. This identification can be used to filter out rules that cannot match, like rules with the preconditions. If there is not a cache entry for the set of groups, one can be computed and added to the cache. The computation can be used to update the cache entry only for those rules that need to be analyzed for matching any remaining conditions, such as where the precondition was matched processing of the rule is required. The cache hit ratio is high even with a small cache in many practical policies, because even if there are lots of groups, there are much fewer groups used in the policy, and there are typically not very many combinations of these groups among the users. The same technique can be used with other matching fields that can have multiple values, such as an IPv6 next protocol field.

In accordance with this example embodiment, consider a user "C" that belongs to groups "A," "B," "C," and 100 other. If a policy only includes "A" and "B," the group information can be filtered so that only "A" and "B" are attached to user "C." For a connection where the user is "C," the cache is checked to see if a user rule match for "C" has been cached, and if a group match for set "A" and "B" has been cached. If those groups are present in the cache, two lists of rules are generated, one list for rules that may match for "C" and another list that may match to users that are in groups "A" and "B". These lists can be used in the same manner as the corresponding lists for IP source, destination and other fields as discussed in U.S. Pat. No. 7,386,525.

If the information for the groups is not in the cache, it is added to the cache. The cache is then checked rule by rule to determine whether the rule matches, assuming only that the user is "C" for the user match cache, and only that the user is in groups "A" and "B" for the group cache. This process yields a high cache hit ratio, because most users do not have user specific rules in a common policy (and the same list of rules can be used for all such users), and the common number, and the number of relevant group combinations is also small in a common policy.

In a sixth example, a route prefix search can be combined with a policy lookup. Adding the destination IP address partitioning (imposed by one or more routing tables) to the partitioning used in the fast policy matching algorithm can save some CPU cycles, because doing one O(log(N+M)) search is usually faster than two smaller searches that are O(log(N)+log(M)).

In a seventh example, a fast matching structure can be computer in a lazy fashion. In the fast matching algorithm, mapping is performed from match field values to a list of rules that may match with that partition. This mapping can be computed incrementally when needed, i.e. when the policy is being matched using a matching field value in this partition. The list of partitions can be computed at the policy load time, but that is quick and requires only a small amount of memory.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A method for filtering data packets at a firewall system comprising:
    receiving a data packet that is transmitted over a public network, the data packet having a plurality of fields at a data packet system;
    processing the data packet using a plurality of rules when it is determined that a precondition does not exist for the one or more of the plurality of fields;
    determining whether one or more rules are stored in a cache for one or more of a plurality of groups associated with a user by comparing one or more data fields from the data packet with one or more data fields of the cache, wherein the cache is separate from the data packet system; and
    processing the one or more rules stored in the cache if present to provide user group matching to identify one or more groups that are associated with the user that are not mentioned in a policy that are to be ignored, and wherein the cache is checked for one or more remaining groups.

2. The method of claim 1 wherein processing the data packet using the one or more rules stored in the cache if present comprises evaluating further conditions associated with the one or more rules stored in the cache for a security policy associated with a user group.

3. The method of claim 1 wherein processing the data packet using the one or more rules stored in the cache if present comprises identifying one or more of the plurality of fields that are associated with a precondition associated with the one or more rules for a security policy and an associated group of the security policy stored in the cache.

4. The method of claim 1 wherein processing the data packet using the one or more rules stored in the cache if present comprises generating the precondition by processing a Boolean expression associated with the one or more rules stored in the cache.

5. The method of claim 1 wherein processing the data packet using the one or more rules stored in the cache if present comprises applying a simplification algorithm to a feature-rich Boolean expression to generate the precondition associated with the one or more rules stored in the cache.

6. The method of claim 1 wherein processing the data packet using the one or more rules stored in the cache if present comprises simplifying a Boolean expression that includes at least one OR operation in combination with at least two AND operations into two Boolean expressions that do not contain an OR operation.

7. The method of claim 1 wherein processing the data packet using the one or more rules stored in the cache if present comprises simplifying a Boolean expression that includes at least one OR operation in combination with at least two AND operations into two Boolean subexpressions that do not contain an OR operation and then evaluating whether one or both of the two Boolean subexpressions is always true or always false.

8. The method of claim 1 wherein processing the data packet using the one or more rules stored in the cache if present comprises:
    simplifying a Boolean expression that includes at least one OR operation in combination with at least two AND operations into two Boolean subexpressions that do not contain an OR operation;
    evaluating whether one of the two Boolean subexpressions is always true or always for all possible values for one or more fields; and
    storing the Boolean subexpression as a precondition.

9. The method of claim 1 wherein processing the data packet using the one or more rules stored in the cache if present comprises:
    receiving filter parameters from a graphic user interface; and converting the filter parameters into a complex Boolean expression for subsequent processing to identify a precondition.

10. The method of claim 1 wherein processing the data packet using the one or more rules stored in the cache if present comprises:
receiving a feature rich Boolean expression;
extracting the precondition from the feature rich Boolean expression; and
storing a remaining condition associated with the precondition.

11. The method of claim 10 further comprising processing the one or more rules stored in the cache to provide optimized identification of matching conditions.

12. The method of claim 11 wherein the optimized identification of matching conditions comprises a shortcut to a matching condition based on a predetermined field value and a number of times a comparison node is visited.

13. The method of claim 10 further comprising processing the remaining condition to provide optimized identification of matching conditions by:
identifying a path comprising a plurality of comparison nodes; and
identifying a path from a first node to a third node as a shortcut to a matching condition.

14. A firewall system for filtering data packets comprising:
a first processor configured to receive a data packet that is transmitted over a public network, the data packet having a plurality of fields from a network interface at a data packet system;
a second processor configured to process the data packet using a plurality of rules when it is determined that a precondition does not exist for the one or more of the plurality of fields; and
a third processor configured to determine whether one or more rules are stored in a cache for one or more of a plurality of groups associated with a user by comparing one or more data fields from the data packet with the one or more data fields of the cache and to process the data packet using the one or more rules stored in the cache if present, wherein the cache is separate from the data packet system, and to process the one or more rules stored in the cache to provide user group matching to identify one or more groups that are associated with the user that are not mentioned in a policy that are to be ignored, and wherein the cache is checked for one or more remaining groups.

15. The system of claim 14 wherein a fourth processor is configured to evaluate further conditions.

16. The system of claim 14 wherein the second processor is configured to identify one or more of the plurality of fields that are associated with a precondition.

17. The system of claim 14 further comprises a fourth processor configured to generate the precondition by processing a Boolean expression.

18. The system of claim 14 wherein the second processor is configured to apply a simplification algorithm to a feature-rich Boolean expression to generate the precondition.

19. The system of claim 14 wherein the second processor is configured to simplify a Boolean expression that includes at least one OR operation in combination with at least two AND operations into two Boolean expressions that do not contain an OR operation.

20. The system of claim 14 wherein the second processor is configured to simplify a Boolean expression that includes at least one OR operation in combination with at least two AND operations into two Boolean subexpressions that do not contain an OR operation and then evaluating whether one or both of the two Boolean subexpressions is always true or always false for all possible values for one or more fields.

* * * * *